United States Patent
Maguire et al.

(10) Patent No.: US 6,321,307 B1
(45) Date of Patent: *Nov. 20, 2001

(54) COMPUTER SYSTEM AND METHOD EMPLOYING SPECULATIVE SNOOPING FOR OPTIMIZING PERFORMANCE

(75) Inventors: David J. Maguire, Spring; Khaldoun Alzien, Houston, both of TX (US)

(73) Assignee: Compaq Computer Corporation, Houston, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/001,528

(22) Filed: Dec. 31, 1997

(51) Int. Cl.⁷ ...................................................... G06F 12/00
(52) U.S. Cl. ............................................ 711/146; 711/168
(58) Field of Search .................................... 711/146, 150, 711/168, 169

(56) References Cited

U.S. PATENT DOCUMENTS

| | | | | |
|---|---|---|---|---|
| 5,630,094 | * | 5/1997 | Hayek et al. ........................ | 711/146 |
| 5,710,906 | * | 1/1998 | Ghosh et al. ........................ | 711/146 |
| 5,737,758 | * | 4/1998 | Merchant ............................. | 711/146 |
| 5,809,537 | * | 9/1998 | Itskin et al. ........................ | 711/146 |
| 5,822,765 | * | 10/1998 | Boatright et al. .................... | 711/146 |
| 5,920,891 | * | 7/1999 | Steinbach et al. .................... | 711/146 |
| 6,049,851 | * | 4/2000 | Bryg et al. .......................... | 711/141 |

* cited by examiner

*Primary Examiner*—Matthew Kim
*Assistant Examiner*—Matthew D. Anderson
(74) *Attorney, Agent, or Firm*—Conley, Rose & Tayon, PC

(57) ABSTRACT

A computer system includes a bus bridge which provides an interface between a processor bus, a main memory and a peripheral bus such as a PCI or AGP bus. When a cycle to memory is initiated on the PCI or AGP bus by a peripheral device, a snoop control circuit of the bus bridge arbitrates for the processor bus to initiate a snoop cycle which corresponds to the line being accessed by the peripheral device. In addition to performing a snoop for the current line being accessed, the snoop control circuit further advantageously runs a speculative snoop cycle for the next sequential line. By performing a speculative snoop cycle on the CPU bus to the next line address, latencies associated with subsequent accesses to memory by the peripheral device may be reduced if the device performs a subsequent sequential access. Furthermore, since the bus bridge performs multiple snoop cycles per arbitration cycle (e.g., multiple snoop cycles are effectuated with only one BPRI_assertion), bandwidth on the CPU bus may be optimized since a CPU bus arbitration cycle may be avoided for the snoop to the sequential line address.

34 Claims, 4 Drawing Sheets

| Snoop Request Address | Address 1 | Address 2 | Address 3 | Address 4 | Address 5 |
|---|---|---|---|---|---|
| Cycles run for | Addr1&2 | Addr3&4 | None | Addr5&6 | None |
| Number Ahead | 1 | 2 | 1 | 2 | 1 |
| Number snoops/req | 2 | 2 | 0 | 2 | 0 |

|  | Speculative Snoop Address Buffer Content | Counter Value |
|---|---|---|
| Request 20H (non-sequential) <br>   Assert BPRI <br>   ↳ Snoop 20H and 40H | 40H | 1 |
| Request 40H <br>   Assert BPRI <br>   ↳ Snoop 60H and 80H | 60H | 2 |
| Request 60H | 80H | 1 |
| Request 80H <br>   Assert BPRI <br>   ↳ Snoop A0H and C0H | A0H | 2 |
| Request A0H | C0H | 1 |

*FIG. 4*

| Snoop Request Address | Address 1 | Address 2 | Address 3 | Address 4 | Address 5 |
|---|---|---|---|---|---|
| Cycles run for | Addr1&2 | Addr3&4 | None | Addr5&6 | None |
| Number Ahead | 1 | 2 | 1 | 2 | 1 |
| Number snoops/req | 2 | 2 | 0 | 2 | 0 |

*FIG. 5*

COMPUTER SYSTEM AND METHOD EMPLOYING SPECULATIVE SNOOPING FOR OPTIMIZING PERFORMANCE

BACKGROUND OF THE INVENTION

1. Field of the Invention

This invention relates to computer systems and, more particularly, to integrated bus bridge designs for use in high performance computer systems. The invention also relates to snooping optimizations in computer systems.

2. Description of the Related Art

Computer architectures generally include a plurality of devices interconnected by one or more buses. For example, conventional computer systems typically include a CPU coupled through bridge logic to an external main memory. A main memory controller is thus typically incorporated within the bridge logic to generate various control signals for accessing the main memory. An interface to a high bandwidth local expansion bug, such as the Peripheral Component Interconnect (PCI) bus, may also be included as a portion of the bridge logic. Examples of devices which can be coupled to the local expansion bus include network interface cards, video accelerators, audio cards, SCSI adapters, telephony cards, etc. An older-style expansion bus may be supported through yet an additional bus interface to provide compatibility with earlier-version expansion bus adapters. Examples of such expansion buses include the Industry Standard Architecture (ISA) bus, also referred to as the AT bus, the Extended Industry Standard Architecture (EISA) bus, and the Microchannel Architecture (MCA) bus. Various devices may be coupled to this second expansion bus, including a fax/modem card, sound card, etc.

The bridge logic can link or interface more than simply the CPU bus, a peripheral bus such as a PCI bus, and the memory bus. In applications that are graphics intensive, a separate peripheral bus optimized for graphics related transfers may be supported by the bridge logic. A popular example of such a bus is the AGP (Advanced Graphics Port) bus. AGP is generally considered a high performance, component level interconnect optimized for three dimensional graphical display applications, and is based on a set of performance extensions or enhancements to PCI. AGP came about, in part, from the increasing demands placed on memory bandwidths for three dimensional renderings. AGP provided an order of magnitude bandwidth improvement for data transfers between a graphics accelerator and system memory. This allowed some of the three dimensional rendering data structures to be effectively shifted into main memory, relieving the costs of incorporating large amounts of memory local to the graphics accelerator or frame buffer.

AGP uses the PCI specification as an operational baseline, yet provides three significant performances extensions or enhancements to that specification. These extensions include a deeply pipelined read and write operation, demultiplexing of address and data on the AGP bus, and ac timing specifications for faster data transfer rates.

Since computer systems were originally developed for business applications including word processing and spreadsheets, among others, the bridge logic within such systems was generally optimized to provide the CPU with relatively good performance with respect to its access to main memory. The bridge logic generally provided relatively poor performance, however, with respect to main memory accesses by other devices residing on peripheral busses, and similarly provided relatively poor performance with respect to data transfers between the CPU and peripheral busses as well as between peripheral devices interconnected through the bridge logic.

Recently, however computer systems have been increasingly utilized in the processing of various real time applications, including multimedia applications such as video and audio, telephony, and speech recognition. These systems require not only that the CPU have adequate access to the main memory, but also that devices residing on various peripheral busses such as an AGP bus and a PCI bus have fair access to the main memory. Furthermore, it is often important that transactions between the CPU, the AGP bus and the PCI bus be efficiently handled. The bus bridge logic for a modem computer system should accordingly include mechanisms to efficiently prioritize and arbitrate among the varying requests of devices seeking access to main memory and to other system components coupled through the bridge logic.

One important aspect associated with bus bridge performance involves snooping operations on the processor bus when a memory write request or a memory read request from a peripheral device such as a PCI device is received. In the case of a memory write by the PCI device, the snoop cycle on the processor bus is required to determine whether a valid line corresponding to the write data exists in the cache of the processor and, if present, to invalidate the line. Furthermore, if the line is modified, the data in the cache may need to be written back to main memory. Similarly, in the case of a memory read by the PCI device, if the line corresponding to the read is modified in the cache, the data in the cache must typically be written back to main memory to allow the data to be read by the PCI device.

Substantial overhead and latency may be associated with the effectuation of a snoop cycle on the processor bus and with related functionality of the bus bridge. Before the bus bridge can initiate the snoop cycle it must arbitrate for the processor bus and wait for any locked transactions to complete. In addition, in the case of a memory write operation by the PCI device, if writeback data is received by the bus bridge from the cache, the writeback data may either need to be written to memory before the data from the PCI bus is written, or be merged with the PCI write data. In the case of a memory read operation by the PCI device, if writeback data is received by the bus bridge from the cache, the writeback data may need to be written to memory before the data can be read by the PCI device, or the writeback data may be snarfed while it is pending in the bridge but prior to its write to main memory. In any of these cases, the snoop cycle must typically be completed before the PCI read or write can be completed by the bus bridge. If the PCI device performs a subsequent read or write operation to an additional cache line address, the bus bridge must initiate another snoop cycle on the processor bus by repeating the foregoing process. That is, the bus bridge must again arbitrate for the processor bus, wait for any locked transactions to complete, and effectuate the additional snoop cycle. Again, the PCI read or write can typically not be completed by the bus bridge until the snoop cycle is completed. The arbitration phase required for obtaining the processor bus upon each snoop cycle can consume considerable bandwidth of the CPU bus. Additionally, the required effectuation and completion of the snoop cycle on the processor bus can limit performance of devices residing on the PCI bus, particularly in situations where a PCI device performs multiple reads and/or writes to main memory. Similar problems are associated with devices residing on other buses, such as an AGP bus.

It would accordingly be desirable to provide a system and method in a computer system wherein the snoop functionality is optimized. It would particularly be desirable to optimize performance of devices that initiate multiple consecutive accesses to memory, and to optimize the bandwidth of the CPU bus.

SUMMARY OF THE INVENTION

The problems outlined above are in large part solved by a system and method employing speculative snooping in accordance with the present invention. In one embodiment, a computer system includes a bus bridge which provides an interface between a processor bus, a main memory and a peripheral bus such as a PCI or AGP bus. When a cycle to memory is initiated on the PCI or AGP bus by a peripheral device, a snoop control circuit of the bus bridge arbitrates for the processor bus to initiate a snoop cycle which corresponds to the line being accessed by the peripheral device. In addition to performing a snoop for the current line being accessed, the snoop control circuit further advantageously runs a speculative snoop cycle for the next sequential line. By performing a speculative snoop cycle on the CPU bus to the next line address, latencies associated with subsequent accesses to memory by the peripheral device may be reduced if the device performs a subsequent sequential access. Furthermore, since the bus bridge performs multiple snoop cycles per arbitration cycle (e.g., multiple snoop cycles are effectuated with only one BPRI_assertion), bandwidth on the CPU bus may be optimized since a CPU bus arbitration cycle may be avoided for the snoop to the sequential line address, In one particular implementation, when a peripheral device performs a memory access to a first cache line, the bus bridge performs a snoop on the CPU bus for that cache line, and additionally performs a speculative snoop to the next cache line. If the peripheral device then performs an access to the sequential line, the bus bridge performs snoop cycles for the next two cache lines. To reduce unnecessary snooping, the bus bridge may be configured to limit the number of speculative snoops that have been effectuated at any given time to two line addresses ahead of the line address of a current request. For example, if the peripheral device performs memory accesses to five sequential cache lines, upon the first request, the bus bridge performs a snoop cycle for that line and a speculative snoop cycle for the next line. When the peripheral device performs the access to the next line, the bus bridge performs speculative snoops to the next two cache lines. Subsequently, when the peripheral device performs an access to the third cache line, the bus bridge will perform no snoop cycles on the CPU bus. Upon the fourth access by the peripheral device, the bus bridge will again speculatively snoop the next two cache lines, and on the fifth access, no snoop cycle will be performed. Thus, when a string of memory accesses to sequential lines occur, a snoop pattern of 2-2-0-2-0 is maintained. When a snoop request to a non-sequential line is received, the pattern starts over again.

The speculative snooping methodology may be similarly employed in other memory control apparatus that control the generation of snoop cycles to maintain memory coherency. By performing speculative snoop cycles, a system may advantageously optimize performance when snooping of cache data is required, particularly when numerous consecutive memory accesses are effectuated. Furthermore, since multiple snoop cycles may be effectuated per arbitration cycle, bandwidth of the CPU bus may be optimized.

BRIEF DESCRIPTION OF THE DRAWINGS

Other objects and advantages of the invention will become apparent upon reading the following detailed description and upon reference to the accompanying drawings in which:

FIG. 4 is a diagram illustrating the snoop functionality associated with a bridge logic unit in response to multiple sequential accesses by a peripheral device.

FIG. 5 is a table illustrating aspects of the speculative snooping functionality.

Figure 1:
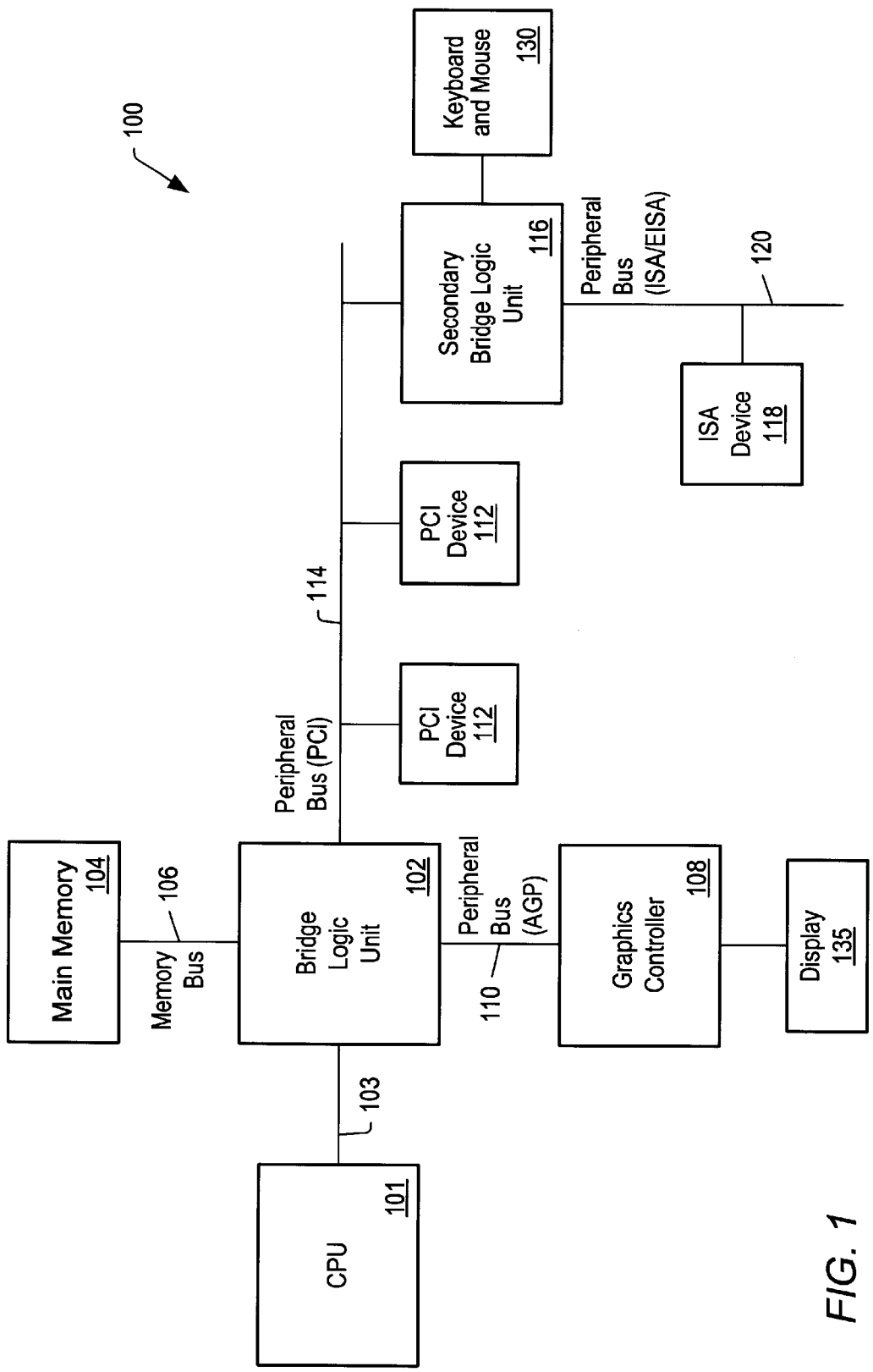
FIG. 1 is a block diagram of a computer system including an integrated bridge logic unit.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

Turning now to the drawings, FIG. 1 is a block diagram of a computer system 100 including a CPU (Central Processing Unit) 101 coupled to a variety of system components through an integrated bridge logic unit 102. In the depicted system, a main memory 104 is coupled to bridge logic unit 102 through a memory bus 106, and a graphics controller 108 is coupled to bridge logic unit 102 through an AGP bus 110. Finally, a plurality of PCI devices 112 are coupled to bridge logic unit 102 through a PCI bus 114. A secondary bridge logic unit 116 may further be provided to accommodate an electrical interface to one or more EISA or ISA devices 118 through an EISA/ISA bus 120.

In addition to providing an interface to an ISA/EISA bus, secondary bridge logic unit 116 may further incorporate additional functionality, as desired. For example, in one embodiment, secondary bridge logic unit 116 includes a master PCI arbiter (not shown) for arbitrating ownership of PCI bus 114. Secondary bridge logic unit 116 may additionally incorporate a disk drive controller, an interrupt controller, and power management support functionality. An input/output controller (not shown), either external from or integrated with secondary bridge logic unit 116, may also be included within computer system 100 to provide operational support for a keyboard and mouse 130 and for various serial and parallel ports, as desired.

CPU 101 is illustrative of, for example, a Pentium® Pro or Pentium® II microprocessor. It is understood, however, that in other embodiments of computer system 100, alternative types of microprocessors could be employed. An external cache unit (not shown) may further be coupled to CPU bus 103 in other embodiments.

Main memory 104 is a memory in which application programs are stored and from which CPU 101 primarily executes out of A suitable main memory 104 comprises DRAM (Dynamic Random Access Memory), and preferably a plurality of banks of SDRAM (synchronous DRAM).

PCI devices 112 are illustrative of a variety of peripheral devices such as, for example, network interface cards, video accelerators, audio cards, hard or floppy disk drives, SCSI (Small Computer Systems Interface) adapters and telephony cards. Similarly, ISA device 118 is illustrative of various types of peripheral devices, such as a disk drive apparatus or a modem.

Graphics controller 108 is provided to control the rendering of text and images on a display 135. Graphics controller 108 may embody a typical graphics accelerator generally known in the art to render three-dimensional data structures which can be effectively shifted into and from main memory 104. Graphics controller 108 may therefore be a master of AGP bus 110 in that it can request and receive access to a target interface within bridge logic unit 102 to thereby obtain access to main memory 104. A dedicated graphics bus accommodates rapid retrieval of data from main memory 104. For certain operations, graphics controller 108 may further be configured to generate PCI protocol transactions on AGP bus 110. The AGP interface of bridge logic unit 102 may thus include functionality to support both AGP protocol transactions as well as PCI protocol target and initiator transactions. Display 135 is any electronic display upon which an image or text can be presented. A suitable display 135 includes a cathode ray tube ("CRT"), a liquid crystal display ("LCD"), etc.

Figure 2:
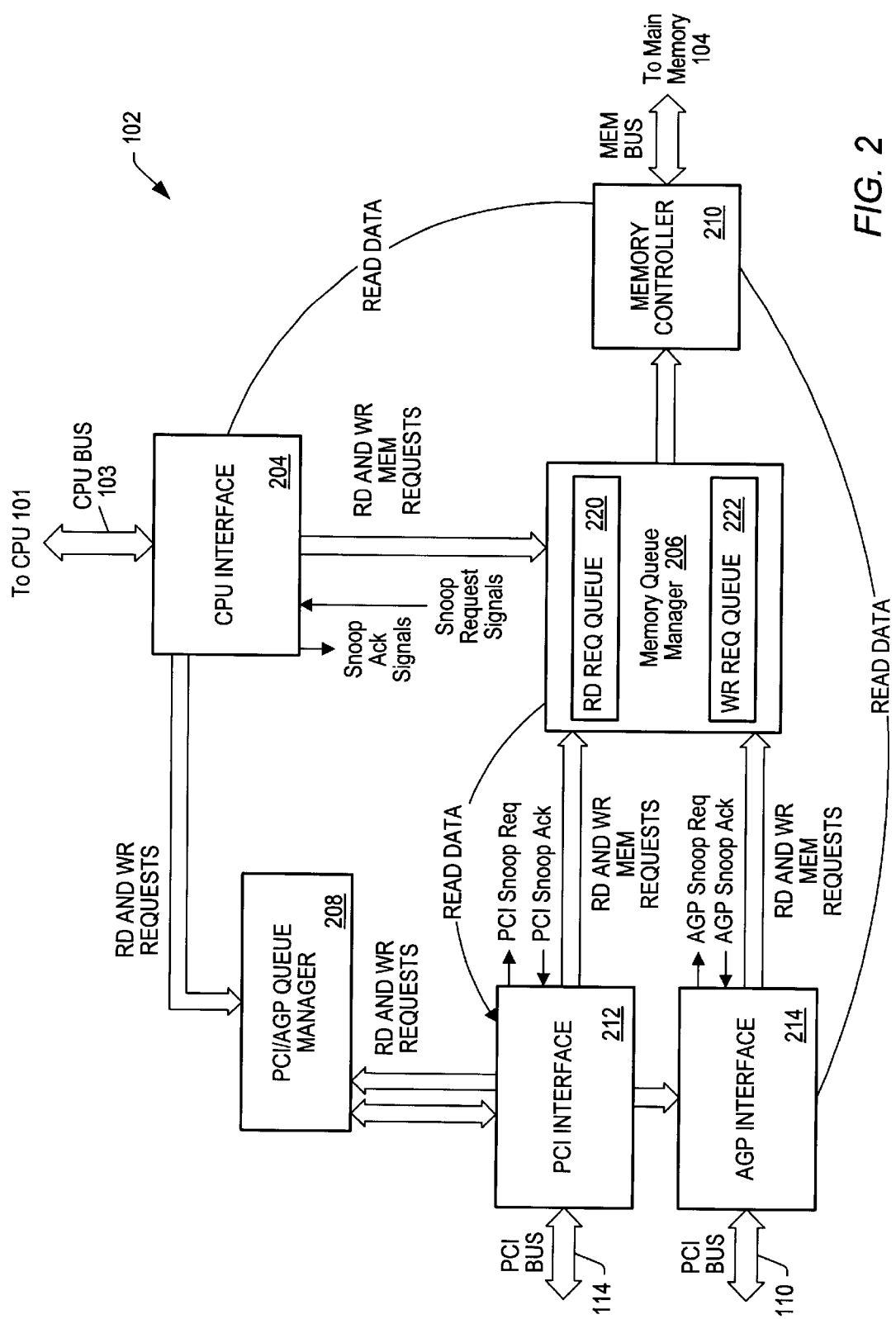
FIG. 2 is a block diagram of one embodiment of a bridge logic unit.

Turning next to FIG. 2, a block diagram of one embodiment of bridge logic unit 102 is shown. The depicted embodiment of bridge logic unit 102 includes a CPU interface 204 coupled to a memory queue manager 206 and a PCI/AGP queue manager 208 (also referred to as the NLM (non-local memory) manager). A memory controller 210, a PCI interface 212, and an AGP interface 214 are further shown coupled to memory queue manager 206. The illustrated components of bridge logic unit 102 may be embodied upon a single monolithic integrated circuit chip.

As will described in further detail below, all requests to main memory 104, both read and writes, are processed through memory queue manager 206. Memory queue manager 206 is configured to receive requests from each of the depicted interfaces, arbitrate between them, and appropriately load each request into either a read request queue 220 or a write request queue 222 (or a high priority request queue (not shown) for high priority AGP read requests and requests requiring GART (Graphics Adapter Remap Table) translation). Requests from read request queue 220 and write request queue 222 are then provided to memory controller 210 which subsequently orchestrates the transfer of data to or from main memory 104. As illustrated, read data resulting from memory read requests may be returned directly to CPU interface 204 and AGP interface 214 from memory controller 210. It is noted that AGP interface 214 may operate in a PCI mode. Cycles effectuated upon AGP bus 110 in the PCI mode are referred to as GCI cycles.

In one embodiment, requests from the depicted interfaces are loaded into memory queue manager one at a time using round-robin arbitration. Memory controller 206 may be configured to service high priority requests pending in memory queue manager 206 with a highest level of priority, and to service read requests in read request queue 220 with a higher priority than write requests pending in write request queue 222, as long as the number of pending write requests in write request queue 222 does not exceed a predetermined threshold. Cross snooping logic may further be provided within memory queue manager 206 to ensure that a request in one of the queues does not bypass an earlier presented request in the other queue.

Non-local memory requests from CPU 101 to devices coupled to either PCI bus 114 or AGP bus 110, as well as requests between AGP bus 110 and PCI bus 114, are processed through PCI/AGP queue manager 208. Non-local memory requests include interrupt acknowledge cycles, I/O cycles, configuration cycles, special cycles and memory cycles to an address range outside of the main memory address range.

Figure 3:
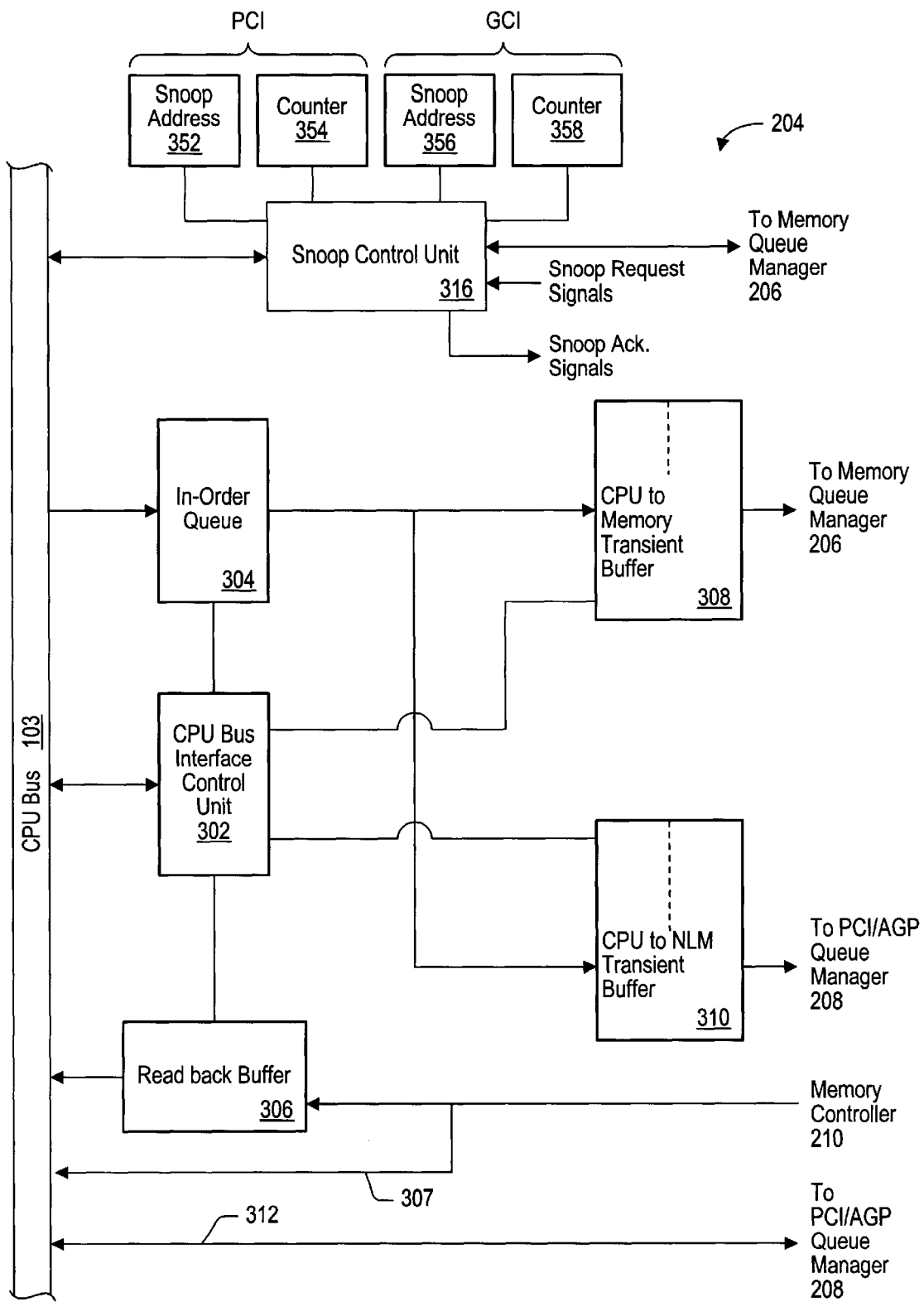
FIG. 3 is a block diagram of one implementation of a CPU interface including a snoop control circuit.

FIG. 3 is a block diagram of one embodiment of CPU interface 204. Generally speaking, CPU interface 204 operates as a target with respect to various transactions effectuated by CPU 101. In the illustrated embodiment, CPU interface 204 includes a CPU bus interface control unit 302 coupled to an in-order queue 304 and to a readback/writeback buffer 306. A CPU to memory transient buffer 309 and a CPU to NLM transient buffer 310 are further illustratively coupled to CPU bus interface control unit 302.

CPU bus interface control unit 302 is provided to detect and track cycles being effectuated upon CPU bus 103. In one embodiment in which CPU 101 is a Pentium® Pro microprocessor, CPU bus interface control unit 302 includes separate state machines for request phase decoding, snoop tracking, response tracking and data tracking. Since the Pentium® Pro (and Pentium® II) microprocessor allows multiple outstanding requests to be pipelined, CPU bus interface control unit 302 may be configured to track multiple cycles concurrently. In one embodiment, up to four CPU bus cycles may be simultaneously active.

As cycles are effectuated, requests from CPU 101 are loaded in order within inorder queue 304. These requests may comprise read or write requests for access to main memory 104, and read or write requests to non-local memory including I/O requests. It is noted that various other request types may further be accommodated, such as various special cycles including flush cycles, interrupt acknowledge cycles, etc. depending upon the specific microprocessor employed in the implementation and the system requirements. In one embodiment, up to four requests may be pending within in-order queue 304 (corresponding to the up to four outstanding transactions that may be pending on CPU bus 103). The removal or retiring of requests within in-order queue 304 is performed when a particular transaction is completed on CPU bus 103.

CPU bus interface control unit 302 is further configured to de-queue requests from in-order queue 304 and to decode the CPU cycles. CPU bus interface unit 302 determines if the CPU request is for access to main memory 104, the GART (Graphics Adapter Remap Table) region, AGP bus 110 or PCI bus 114. Furthermore, CPU bus interface control unit 302 may determine if the transaction can be accepted, posted, or if it has to be retried.

Several buffers may be incorporated within CPU interface 204. CPU to memory transient buffer 308 interfaces to memory queue manager 206, and in one implementation is two cache lines deep. CPU to non-local memory (NLM) transient buffer 310 interfaces to the PCI/AGP queue manager 208. In one implementation, CPU to NLM transient buffer 310 is also two cache lines deep. These buffers provide a simple mechanism for the CPU interface 204 to communicate to other modules of the bridge logic unit 102 for read, write and other miscellaneous requests.

CPU to memory transient buffer 308 provides an area where memory requests can be stored until they can be serviced by memory queue manager 206. Since CPU to memory transient buffer 308 may be two lines deep, memory queue manager 206 may read one location while another request is being loaded into the other location via in-order queue 304. The request information contained by CPU to memory transient buffer 308 includes a request address, request type information, and write data (for write requests only). In one embodiment memory queue manager 206 extracts data 64-bitg at a time from the data portions residing within CPU to memory transient buffer 308.

Various transactions from CPU 101 to either AGP bus 110 or PCI bus 114 (discussed further below) are communicated through CPU to NLM transient buffer 310 to PCI/AGP queue manager 208. In one implementation, all requests to the PCI/AGP queue manager 208 are quadword (i.e., 64-bits) based only. Cache line writes from CPU 101 occupy four locations in the data portions of the CPU to NLM transient buffer, but only one address. An individual request to the PCI/AGP queue manager 208 is generated for each of the quadwords, wherein the stored address is incremented by one after each request.

In one implementation, CPU to memory transient buffer 308 may always request a full cache line of data from main memory 104, even if the actual request is a single quadword read. On the other hand, the CPU to NLM transient buffer 310 only requests a quadword of data at a time.

A feedback path for data read from main memory 104 is provided through read back buffer 306. A bypass path 307 may further be provided to allow data to bypass the readback buffer 306 and be directly driven upon CPU bus 103. Furthermore, read data from PCI/AGP queue manager 208 is provided upon a path 312. The CPU bus interface control unit 302 may also be configured to speculatively prefetch sequential lines from main memory 104. This speculatively fetched information may be temporarily stored in readback buffer 306.

CPU interface 204 may configured such that certain write cycles are always posted, and such that other cycles are never posted. Similarly, certain types of read cycles may result in snoop stalls, while others will not. For example, in one implementation I/O cycles are never posted, while memory cycles to main memory 104 as well as to non-local memory are always posted. I/O reads and non-local memory reads may result in snoop stalls until data is ready since the cycle may need to be retried under certain circumstances, as discussed further below. On the other hand, reads to main memory may not result in snoop stalls; rather, CPU bus interface control unit 302 may simply withhold assertion of the DRDY signal until the requested data is available in readback/writeback buffer 306. It is noted that CPU to memory transient buffer 308 and CPU to NLM transient buffer 310 function as a write posting buffer to allow address and data from CPU 101 to be accumulated until the appropriate queue manager can service the requests, and also function as read request buffers where multiple read cycles can be outstanding.

A snoop control unit 316 is finally illustrated within CPU interface 204. Snoop control unit 316 is configured to generate snoop transactions on CPU bus 103 in response to PCI cycles to main memory 104. Snoop control unit 316 is further configured to generate snoop transactions on CPU bus 103 in response to GCI cycles to cacheable locations initiated by devices residing on AGP bus 110. More specifically, referring collectively to FIGS. 1–3, when a memory read or write cycle to a cacheable memory location is initiated on PCI bus 114 or AGP bus 110, a snoop request (e,g., PCI Snoop Req. or AGP Snoop Req.) is generated by the corresponding PCI interface 212 or AGP interface 214 and is provided to CPU interface 204 via memory queue manager 206. Assuming initially that the cycle does not correspond to a cache line which is sequential to the cache line of the immediately preceding snoop request received from the PCI interface 212 or AGP interface 214, snoop control circuit 316 arbitrates for ownership of CPU bus 103 to allow it to initiate a snoop cycle on CPU bus 103 corresponding to the line being accessed by the peripheral device. In one embodiment where CPU 101 is a Pentium® Pro or Pentium® II microprocessor, snoop control unit 316 arbitrates for CPU bus 103 by asserting signal BPRI_. In addition to performing a snoop for the current line being accessed, snoop control unit 316 further runs a speculative snoop cycle for the sequential line. By performing a speculative snoop cycle to the next line address on the CPU bus 103, latencies associated with subsequent accesses to main memory 104 may be reduced if the PCI or AGP device performs a subsequent sequential access. Furthermore, since bus logic unit 102 performs multiple snoop cycles per arbitration cycle, bandwidth on CPU bus 103 may be optimized since a CPU bus arbitration cycle may be avoided for the snoop to the sequential line address.

FIG. 3 further illustrates a speculative snoop address buffer 352, a counter 354, a second speculative snoop address buffer 356 and a counter 358. As will be described in further detail below, speculative snoop address buffer 352 and counter 354 are provided to maintain information regarding speculative snoop cycles that have been performed on behalf of PCI transactions on PCI bus 114. More specifically, speculative snoop address buffer 352 stores the address of a first cache line for which a speculative snoop cycle has been performed, and counter 354 track the number of lines that have been snooped ahead. Additional logic in snoop control unit 316 is provided to invalidate the speculative snoop information if certain cycles including CPU to memory cycles on CPU bus 103 are received that correspond to an address for which a speculative snoop is pending. The speculative snoop information stored by snoop address buffer 352 and counter 354 is also invalidated if a CPU to PCI non-write combinable cycle is performed. Speculative snoop address buffer 356 and counter 358 provide similar functionality for GCI cycles.

Details regarding a particular implementation of the speculative snooping methodology employed by bridge logic unit 102 will next be discussed in conjunction with FIGS. 4 and 5. FIG. 4 is a diagram illustrating the snooping functionality of the bridge logic unit 102 when multiple PCI or GCI memory cycles are performed to sequential cache lines. FIG. 5 is a table illustrating aspects of the speculative snooping functionality.

Referring collectively to FIGS. 1–5, assume that initially PCI device 112 performs a memory write request on PCI bus 114 to the cache line address "20H" (depicted generally as "address 1" in FIG. 5). When the memory write cycle is received by PCI interface 212, a snoop request signal (PCI Snoop Req.) is generated and provided to CPU interface 204 via memory queue manager 206. Assuming also that the previous cycle initiated on PCI bus 114 for which a PCI Snoop Req. was generated did not correspond to a write cycle to the immediately preceding cache line, snoop control unit 316 responsively arbitrates for CPU bus 103. As stated previously, in a system employing a Pentium® Pro or Pentium® II microprocessor, this request for ownership of CPU bus 103 may be carried out by an assertion of the signal BPRI_. After any locked cycles on CPU bus 103 have completed and snoop control unit 316 is granted ownership of the bus, snoop control unit 316 effectuates a snoop cycle for the cache line address of the request (i.e., 20H in this case) and further performs a speculative snoop cycle for the next sequential cache line address (40H). Upon completion of the snoop phase of the snoop cycle for address 20H, CPU interface 204 generates a snoop acknowledge signal which is provided to PCI interface 212 via queue manager 206. Ag illustrated in FIG. 4, following these operations, an address value of 40H is stored within speculative snoop address buffer 352, and the value associated with counter 354 is 1. This information indicates that a speculative snoop cycle has been performed for cache line 40H (and thus that the system has performed a speculative snoop one address ahead of the most recent request).

If the next write request initiated on PCI bus 114 is a write request to the sequential cache line (40H), another PCI snoop request corresponding to that cycle is generated by PCI interface 212 and provided to CPU interface 204. In response to this additional snoop request, since snoop control unit 316 has already effectuated a snoop cycle for line 40H, snoop control unit 316 can immediately generate a snoop acknowledge for the cycle. In addition, snoop control unit 316 again arbitrates for CPU bus 103 by asserting signal BPRI_, and performs speculative snoop cycles for the next two sequential cache lines (60H and 80H) after ownership of the bus is obtained. As illustrated in FIG. 4, at this point the content of speculative snoop address buffer 352 is updated to store an address of 60H, and the value associated with counter 354 is 2. The information stored by speculative snoop address buffer 352 and counter 354 thus indicates that two speculative snoops have been performed for address 60H and 80H. The system at this point has performed speculative snoop cycles two ahead of the most recent request.

Upon receipt of a write cycle on PCI bus 114 to the next sequential cache line at address 60H, PCI interface again provides a PCI snoop request signal for this transaction to CPU interface 204. At this point, however, since the value in counter 354 is 2, indicating that speculative snoop cycles have been performed for two cache lines ahead of the previously received request, the snoop control unit 316 does not perform any additional snoop cycles. Instead, snoop control unit 316 provides a snoop acknowledge signal back to PCI interface 212, and updates the content of speculative snoop address buffer 352 with a value of 80H. The snoop control unit 316 further causes counter 354 to decrement to the value of 1. This indicates that one speculative snoop cycle remains pending that was performed for the cache line address 80H. When PCI interface 212 receives yet an additional write request to 80H, since the current counter value is 1, snoop control unit 316 again performs speculative snoop cycles for the next two caches lines and provides a snoop acknowledge back to PCI interface 212 for the current request. Similar to the foregoing discussion, when the snoop cycles to A0H and C0H are performed, an address value of A0H is stored within speculative snoop address buffer 352, and counter 354 is incremented to a count value of 2. When a write request to sequential cache line A0H is received by PCI interface 212, no further snoop cycles are performed since counter 354 indicates that two speculative snoops were outstanding.

In accordance with the foregoing, when a string of memory accesses to sequential lines occur to form speculative "hits", a snoop pattern of 2-2-0-2-0 is maintained, as illustrated in FIG. 5. When a snoop request to a non-sequential line is received, a speculative "miss" occurs, which causes the pattern to start over.

In one implementation, PCI cycles are tracked independently of GCI cycles. That is, the information stored by speculative snoop address buffer 352 and counter 354 is updated only in response to cycles run on PCI bus 114, and is independent of GCI cycles run on AGP bus 110. Similarly, speculative snoop address buffer 356 and counter 358 store information pertaining only to GCI cycles run on AGP bus 110. Accordingly, consecutive PCI cycles (of the same type) to sequential cache lines are considered to be "speculative hits" even though intervening GCI cycles on AGP bus 110 to non-sequential cache lines may be received by bus bridge 102, and vice versa.

Furthermore, in one implementation, consecutive PCI or GCI cycles to sequential lines must be of the same type (i.e., all read or all write) to be considered speculative hits. Thus, if a PCI write cycle is first initiated to cache line 201, a snoop cycle for cache line 20H as well as a speculative snoop cycle for cache line 40H will be performed. Subsequently, if a PCI read cycle to the sequential line 40H is received, a speculative miss occurs since the accesses are not of the same type, and therefore snoop control unit 316 initiates another snoop cycle on CPU bus 103 for the cache line address 40H, as well as a speculative snoop cycle for the sequential cache line 60H. Finally, in one implementation, bridge logic unit 102 performs no speculative snoop cycles in response to write and invalidate cycles run on the PCI or GCI bus.

As stated previously, the speculative snoop information contained by speculative snoop address buffer 352 and counter 354 (which pertains to cycles run on PCI bus 114) and the speculative snoop information contained by speculative snoop address buffer 356 and counter 358 (which pertains to GCI cycles run on AGP bus 110) may be invalidated by snoop control unit 316 in certain situations. More specifically, the speculative snoop information contained by speculative snoop address buffer 352 and counter 354 is invalidated in response to a CPU to memory cycle on CPU bus 103 to an address for which a speculative snoop is pending (as indicated by the information stored by speculative snoop address buffer 352 and counter 354). The speculative snoop information contained by snoop address buffer 352 and counter 354 is also invalidated in response to CPU to PCI non-write combinable cycles. In a similar manner, the speculative snoop information contained by speculative snoop address buffer 356 and counter 358 is invalidated in response to a CPU to memory cycle to an address for which a speculative snoop is pending (as indicated by the speculative snoop information contained by speculative snoop address buffer 356 and counter 358), and in response to CPU to GCI non-write combinable cycles.

It is noted that by invalidating the speculative snoop information contained by speculative snoop address buffer 352 and counter 354 and/or the speculative snoop information contained by speculative snoop address buffer 356 and counter 358 in response to an occurrence of a CPU to memory cycle on CPU bus 103 to an address that corresponds to the associated speculative snoop information, cache coherency is advantageously maintained. For example, consider a situation wherein PCI device 112 performs a write to main memory at location 20H. In accordance with the previous discussion, snoop control unit 316 responsively performs snoop cycles for addresses 20H and 40H. If CPU 101 subsequently allocates a line in its cache in response to a CPU to memory read of address 40H, the line may be placed in the CPU's cache in a shared state. By invalidating the speculative snoop information contained by speculative snoop address buffer 352 and counter 354 (which would otherwise indicate that a speculative snoop has been completed for line 40H), the shared line in the CPU's cache will be invalidated by a subsequent snoop cycle that is run for a subsequent PCI write to location 40H by PCI device 112.

It is also noted that by invalidating the speculative snoop information contained by speculative snoop address buffer 352 and counter 354 in response to CPU to PCI non-write combinable cycles, and by invalidating the speculative snoop address information contained by speculative snoop address buffer 356 and counter 358 in response to CPU to GCI non-write combinable cycles, system coherency is advantageously maintained. For example, consider a situation in which PCI device 112 performs a read cycle to memory location 20H. Snoop control unit 316 will responsively perform snoop cycles for addresses 20H and 40H. CPU 101 may subsequently perform a write to location 40H which might result in a hit to a line already residing in its cache. This line is thus marked modified in the cache. CPU 101 may subsequently perform a synchronizing operation by performing a write to PCI bus 114 indicating that it has completed its write to address 40H. In response to this write, PCI device 112 may read address 40H. In such situations, system coherency is advantageously maintained since the speculative snoop information contained by speculative snoop address buffer 352 and counter 354 (indicating a speculative snoop for address 40H was performed) is invalidated in response to the synchronizing operation. Another snoop cycle is generated for address 40H in response to the PCI read, causing the modified line in the CPU's cache to be written back to main memory. It is noted that CPU to PCI cycles and CPU to GCI cycles to write combinable locations may not cause invalidation of the speculative snoop information maintained by CPU interface 204 since such write combinable cycles cannot be used as synchronizing events.

In a further implementation, transient hit logic may be provided to ensure proper operation when certain cycles are received at different buses at approximately the same time. For example, logic may be provided to detect the existence of writeback data within CPU to memory transient buffer 308 which was written back in response to a PCI cycle to a modified line. The transient hit logic will guarantee the writeback data will be written to main memory before a PCI read to the same line is performed. This ensures the most recent data is returned.

Similarly, logic may be provided to ensure that requests are loaded into memory queue manager 206 in a proper order in instances when speculative snoop information is being invalidated. More particularly, if a cycle is effectuated on CPU bus 103 which would cause the invalidation of speculative snoop information to occur, and at approximately the same time a PCI or GCI cycle is performed to an address which corresponds to the speculative snoop information to be invalidated, the speculative snoop information will either be invalidated and the CPU cycle loaded before the snoop acknowledge or the speculative snoop information will not be invalidated and the CPU cycle will be loaded after the snoop acknowledge. Therefore, the ordering of cycles effectuated on the CPU bus with respect to snoop cycles is consistent with the ordering of those same cycles as they are loaded into memory queue manger 206.

CPU interface 204 may finally be configured to allow writeback data pending in CPU to memory transient buffer 308 to be snarfed in response to PCI or GCI read cycles. In this manner, latency may be decreased since the read data may be provided before the writeback data is written into main memory 104.

It is further noted that, in other embodiments, the speculative snooping pattern maintained by snoop control circuit 316 may be modified. For example, the system may perform more or less than two snoop cycles per arbitration cycle or snoop ahead more or less than two addresses. Furthermore, in other embodiments, the speculative snooping methodology may be employed within other types of memory control apparatus which are configured to effectuate snoop cycles to maintain memory coherency.

It is also noted that other specific implementations of various aspects of bridge logic unit 102 are possible. For example, additional request types may be supported by the bus interfaces, as desired, depending upon the overall requirements of the system. Furthermore, other specific implementations of the various bus interfaces as well as of a memory queue manager are possible.

Numerous variations and modifications will become apparent to those skilled in the art once the above disclosure is fully appreciated. It is intended that the following claims be interpreted to embrace all such variations and modifications.

What is claimed is:

1. A computer system comprising:
   a main memory;
   a display apparatus;
   a memory control apparatus operatively coupled to said display apparatus and said main memory and configured to control accesses to said main memory;
   a cache memory subsystem coupled to said memory control apparatus through a first bus; and
   a device coupled to said memory control apparatus through a second bus, wherein said device is configured to perform a first memory access request to a specific address;
   wherein, in response to said first memory access request, said memory control apparatus is configured to generate a snoop cycle upon said first bus corresponding to said specific address and to generate a first speculative snoop cycle upon said first bus corresponding to a second address which is sequential to said specific address; and
   wherein, in response to said device performing a second memory access request corresponding to said second address, said memory control apparatus is further configured to generate a plurality of speculative snoop cycles to predictively snoop ahead of said second address by at least two cache lines independent of whether said device performs a request for any of said at least two cache lines.

2. The computer system as recited in claim 1 wherein said specific address corresponds to a cacheable line address associated with said cache memory subsystem.

3. The computer system as recited in claim 2 wherein said second address is a sequential line address with respect to said specific address.

4. The computer system as recited in claim 1 wherein said plurality of speculative snoop cycles includes a second speculative snoop cycle corresponding to a third address which is sequential to said second address, and a third speculative snoop cycle corresponding to a fourth address which is sequential to said third address.

5. The computer system as recited in claim 4, wherein said memory control apparatus is further configured to inhibit generation of a fourth speculative snoop cycle in response to a third memory access request to said third address.

6. The computer system as recited in claim 5, wherein said memory control apparatus is configured to generate a pair of speculative snoop cycles in response to a fourth memory access request to said fourth address.

7. The computer system as recited in claim 1 wherein said memory control apparatus includes a snoop control circuit coupled to receive an indication of said first memory access request by said device, wherein said snoop control circuit is configured to generate said snoop cycle.

8. The computer system as recited in claim 7 further comprising a speculative snoop address buffer coupled to said snoop control circuit, wherein said speculative snoop address buffer is configured to store an address of a pending speculative snoop cycle.

9. The computer system as recited in claim 8 wherein said snoop control circuit is further configured to invalidate said speculative snoop cycle in response to a cycle initiated on said first bus.

10. The computer system as recited in claim 9 further comprising a microprocessor coupled to said first bus.

11. The computer system as recited in claim 10 wherein said cycle initiated on said first bus is a CPU to memory cycle to an address that matches said address stored in said speculative snoop address buffer.

12. The computer system as recited in claim 10 wherein said cycle initiated on said first bus is a CPU to said second bus cycle.

13. The computer system as recited in claim 12 wherein said CPU to said second bus cycle is a non-write combinable cycle.

14. A computer system comprising:
 a main memory;
 a display apparatus;
 a bus bridge unit operatively coupled to said display apparatus and said main memory and configured to control accesses to said main memory;
 a cache memory subsystem coupled to said bus bridge unit through a first bus; and
 a device coupled to said bus bridge unit through a second bus, wherein said device is configured to perform a first memory access request to a specific address;
  wherein, in response to said first memory access request, said bus bridge unit is configured to generate a snoop cycle upon said first bus corresponding to said specific address and to generate a first speculative snoop cycle upon said first bus corresponding to a second address which is sequential to said specific address; and
  wherein, in response to said device performing a second memory access request corresponding to said second address, said bus bridge unit is further configured to generate a plurality of speculative snoop cycles to predictively snoop ahead of said second address by at least two cache lines independent of whether said device performs a request for any of said at least two cache lines.

15. The computer system as recited in claim 14 wherein said specific address corresponds to a cacheable line address associated with said cache memory subsystem.

16. The computer system as recited in claim 15 wherein said second address is a sequential line address with respect to said specific address.

17. The computer system as recited in claim 14 wherein said plurality of speculative snoop cycles includes a second speculative snoop cycle corresponding to a third address which is sequential to said second address, and a third speculative snoop cycle corresponding to a fourth address which is sequential to said third address.

18. The computer system as recited in claim 17, wherein said bus bridge unit is further configured to inhibit generation of a fourth speculative snoop cycle in response to a memory access request to said third address.

19. The computer system as recited in claim 18 wherein said bus bridge unit is configured to generate a pair of speculative snoop cycles in response to a fourth memory access request to said fourth address.

20. The computer system as recited in claim 16 wherein said bus bridge unit includes:
 a CPU interface coupled to said first bus;
 a second interface coupled to said second bus;
 a memory controller coupled to said main memory; and
 a memory queue manager coupled to receive memory access requests from said CPU interface and said second bus interface and to provide said memory access requests to said memory controller.

21. The computer system as recited in claim 20 wherein said memory queue manager includes a write request queue coupled to receive write requests from said CPU interface and said second bus interface.

22. The computer system as recited in claim 21 wherein said memory queue manager includes a read request queue coupled to receive read requests from said CPU interface and said second bus interface.

23. The computer system as recited in claim 22 wherein said CPU interface includes a snoop control circuit coupled to receive an indication of said first memory access request by said device, wherein said snoop control circuit is configured to generate said snoop cycle.

24. The computer system as recited in claim 23 further comprising a speculative snoop address buffer coupled to said snoop control circuit, wherein said speculative snoop address buffer is configured to store an address of a pending speculative snoop cycle.

25. The computer system as recited in claim 24 wherein said snoop control circuit is further configured to invalidate said pending speculative snoop cycle in response to a CPU to memory cycle initiated on said first bus that matches said address stored in said speculative snoop address buffer.

26. The computer system as recited in claim 24 wherein said snoop control circuit is further configured to invalidate said pending speculative snoop cycle in response to a CPU to said second bus cycle.

27. A method for generating snoop cycles in a bus bridge of a computer system, wherein said bus bridge provides an interface between a first bus coupled to a cache memory subsystem, a main memory, and a second bus coupled to a device, said method comprising:
 said device initiating a first memory access request to a specific address on said first bus;
 said bus bridge performing a snoop cycle on said first bus corresponding to said specific address in response to said first memory access request; and
 said bus bridge performing a first speculative snoop cycle on said first bus corresponding to a second address which is sequential to said specific address in response to said first memory access request; and
 in response to said device performing a second memory access request corresponding to said second address, said bus bridge generating a plurality of speculative snoop cycles to predictively snoop ahead of said second address by at least two cache lines independent of whether said device performs a request for any of said at least two cache lines.

28. The method as recited in claim 27 wherein said specific address corresponds to a cacheable line address associated with said cache memory subsystem.

29. The method as recited in claim 28 wherein said second address is a sequential line address with respect to said specific address.

30. The method as recited in claim 27 wherein said plurality of speculative snoop cycles includes a second speculative snoop cycle corresponding to a third address which is sequential to said second address, and a third speculative snoop cycle corresponding to a fourth address which is sequential to said third address.

31. The method as recited in claim 30, further comprising inhibiting generation of a fourth speculative snoop cycle in response to a memory access request to said third address.

32. The method as recited in claim 31 further comprising generating a pair of speculative snoop cycles in response to a fourth memory access request to said fourth address.

33. The method as recited in claim 29 further comprising storing an address of said speculative snoop cycle.

34. The method as recited in claim 27 further comprising invalidating said speculative snoop cycle in response to a cycle initiated on said first bus.

* * * * *